Patented June 17, 1930

1,764,962

UNITED STATES PATENT OFFICE

KENNETH B. LACY, OF CHICAGO, ILLINOIS, ASSIGNOR TO VAN SCHAACK BROS. CHEMICAL WORKS, INC., OF CHICAGO, ILLINOIS

PROCESS OF DEHYDROGENATING ALCOHOLS

No Drawing.   Application filed July 22, 1926.   Serial No. 124,302.

My invention relates to an improved process for the dehydrogenation of alcohols.

One purpose of my invention is to provide a process for the economical production of aldehydes by the partial dehydrogenation of aliphatic alcohols in the presence of a suitable catalyst. Another purpose is to make this process continuous, without the necessity of supply heat from an external source to the reacting mixture during the progress of the dehydrogenation. A third purpose is to supply the heat required for the endothermic dehydrogenation from a simultaneously occurring, exothermic reaction. Another purpose is to provide means for decreasing the rate of poisoning of the catalyst by the products of the exothermic reaction. Other purposes will appear from the detailed description which follows.

The dehydrogenation of ethyl alcohol, for example, may be represented by the equation $$CH_3.CH_2OH = CH_3.CHO + H_2 - Heat$$

Temperatures of 250 to 350° C. are favorable for this reaction. But the rate of reaction is so extremely slow as to be of no commercial interest unless a catalyst is present. It has been proposed, therefore, to pass alcohol vapor at an elevated temperature over copper or other metals in the condition of active catalysts.

The heat absorbed in the dehydrogenation is so large that the alcohol vapor, in passing over active catalyst, quickly cools itself to a temperature so low that the dehydrogenation becomes exceedingly slow. Thus, I have found, in passing ethyl alcohol vapor at 325° C. through a tower packed with active copper catalyst, that the dehydrogenation takes place only slowly after the vapor has passed through the first six inches of depth of catalyst.

Readings on thermocouples, spaced at close intervals, explain the slowing down of the dehydrogenation as being due to lowering of the temperature.

Having the entire dehydrogenation tower uniformly warmed to 325° C., at the start of the experiment, and carefully insulated against heat loss does not suffice. There is actual absorption of a large amount of heat which must be supplied from some other source if the dehydrogenation is to proceed.

Others have noted the same difficulty. One has suggested electrical heating of the catalyst, by the passage of a current through it, in order to maintain the proper temperature for the dehydrogenation. Another has measured the heat of dehydrogenation quantitatively.

From this quantitative measurement of the heat absorbed in forming a molecule of aldehyde and a molecule of hydrogen from ethyl alcohol, I have calculated that this quantity of heat may be supplied by burning, to form water, approximately one-half of the hydrogen which is liberated as a by-product of the dehydrogenation. The calculation has been confirmed by repeated experimentation. I produce these two reactions simultaneously, in the vapor mixture as it passes over the catalyst, $$2CH_3.CH_2OH = 2CH_3.CHO + 2H_2 - Heat$$
$$H_2 + O = H_2O + Heat$$

In other words, I mix with the alcohol enough oxygen, preferably in the form of air, to burn approximately one molecule of hydrogen for every two molecules of it liberated in the dehydrogenation. Under such conditions, there is practically no net heat absorption or production from the mixture, the endothermic and exothermic reactions compensating each other.

Should losses of heat by conduction through the walls of the reaction vessel be considerable, these may be offset by burning hydrogen in addition to the amount which is burned to compensate for the heat absorbed in the dehydrogenation. With thermocouples suitably placed, one may control the temperature by simply admitting more air to raise the temperature, or less air to lower it.

This use of air in amount sufficient to maintain the optimum temperature of reaction through the entire mass of catalyst eliminates a large difficulty in the economical dehydrogenation of alcohol. Unfortunately, however, by-products are produced which poison the catalyst and lead to a reduction of its activity after only a few hours of use.

A fresh catalyst showing a dehydrogenation of 65% of the alcohol vapor passed over it, in the form of an alcohol-air mixture as above described, will show a dehydrogenation of only 20 to 30% after 4 hours of use.

This rapid poisoning is prevented by a second feature which is necessary to my invention. I incorporate into the air-alcohol vapor mixture an agent which either prevents the formation of or removes those products which are a poison to the catalyst. A suitable purifying agent for this purpose is water vapor.

By using a mixture of air, alcohol, and water in selected proportions, I not only maintain a suitable temperature of reaction but also keep the copper sufficiently clean to be catalytically active for long periods of time.

This decreases the frequency with which the continuous process must be interrupted for reviving the catalyst.

A specific example of one method of using my invention follows. Copper catalyst, in a very active condition, is poured into a vertical copper pipe to a depth of 30 inches. The pipe has previously been wound with electrical resistance wire (to supply the heat necessary to start the reaction) and has been provided with thermocouples and air-inlet ports at six-inch intervals, from bottom to top. A mixture of 45 parts by weight of water with 55 parts of alcohol, substantially free from impurities which act as catalyst poisons, is vaporized in a flash evaporator and warmed in a preheater to 380–400° C. This alcohol-steam mixture is then passed into the catalyst tube which has been previously warmed by its electrical heating system to 330° C. After the reaction has begun, the electrical current is shut off entirely, and enough air admitted to the various ports to maintain the temperature in each section of the catalyst bed at 275 to 335° C. If the temperature at the position of any thermocouple becomes lower than desired, more air is admitted at the air port immediately below the position of the couple. If the temperature becomes too high, the supply of air to the lower port is decreased. I use about 1000 cu. ft. air, calculated to 0° and 760 mm. pressure for 46 lbs. alcohol actually dehydrogenated or for 71 lbs. alcohol fed to the catalyst, when the extent of the dehydrogenation is 65%. This proportion of air will burn somewhat more than half of the hydrogen. This provides a small amount of heat to offset the loss of heat through the furnace walls, and also supplies the much larger quantity of heat absorbed in the dehydrogenation.

This illustrative example shows only one of the many methods of carrying out my invention. Details may be varied within a wide range. The temperatures of reaction, for example, may be varied to give optimum conditions for other catalysts than the copper used in the example, as, for example, for nickel or silver. The ethyl alcohol may be substituted by methyl, propyl, butyl or other alcohol. The proportion of water may be varied over a wide range, as from 15 to 80% of the weight of the alcohol. However, the purifying action of water becomes marked only as the proportions exceed certain minimum ranges. These minima vary with the different alcohols; in the case of ethyl alcohol 45% or more of water gives optimum results, but under some conditions it may be desirable to use less than this amount. For example, I have found that, with only 30 parts by weight of water to 70 parts of alcohol, the amount of the alcohol dehydrogenated, by passage over porous copper catalyst, fell from 65% of the alcohol used, with fresh catalyst, to 35% for the same catalyst after 6 hours of use. In another, comparable experiment, with 45 parts of water to 55 parts of alcohol, the percentage conversion did not fall to 35% until after 50 hours of use of the catalyst. The proportion of air may also be varied. Thus, with an inactive catalyst, which gives less dehydrogenation and, therefore, less heat absorption, there is required less air in proportion to the alcohol used. Other diluents or purifiers than steam may be used, although steam has given exceptionally good results in more than a score of extensive experiments.

It is not necessary to my invention to explain the action of the purifier. It is known, however, that certain materials of low volatility readily poison the copper catalyst. Presumably these materials of high boiling point form a film, by condensation, on the surface of the catalyst. Removal of such films by steam distillation seems entirely possible. Also, steam is known to produce differential oxidation at elevated temperatures. Thus carbon is activated by the differential oxidation of the film of hydrocarbons in the pores of charcoal, to produce commercial, activated carbon.

I do not limit my invention to any theory or explanation of it. I utilize all of the effects of the air and purifying agent to give a process which is operable continuously.

Catalyst poisons in commercial alcohols may be detected by passage over the catalyst, under carefully controlled conditions, and comparing the extent of the resulting dehydrogenation with that obtained under identical conditions of dehydrogenation with alcohol of satisfactory quality.

I claim:

1. The process of dehydrogenation of an alcohol which comprises the passage over a catalyst at a temperature of 250 to 350° C. of a mixture of alcohol vapor, air, and water vapor, the proportion of water vapor to alcohol being greater than 15 pounds of water to 85 pounds of alcohol.

2. The process of dehydrogenation of an aliphatic alcohol which comprises the passage over a catalyst at a temperature of 250 to 350° C. of a mixture of alcohol vapor, air, and water vapor, the proportion of water vapor to alcohol being greater than 15 pounds of water vapor to 85 pounds of alcohol.

3. The process of dehydrogenation of ethyl alcohol which comprises the passage over a catalyst of a mixture of alcohol vapor, air, and water vapor, the proportion of water to alcohol being greater than 30 pounds of water vapor to 70 pounds of alcohol.

4. The process of dehydrogenation of ethyl alcohol which comprises the passage over a copper catalyst at a temperature of 250 to 350° C. of a mixture of alcohol vapor, air, and water vapor.

5. The process of dehydrogenation of ethyl alcohol which comprises the passage over a copper catalyst of a mixture of alcohol vapor, air, and water vapor, the proportion of water vapor being not less than 30 pounds to 70 pounds of alcohol.

6. The process of dehydrogenation of ethyl alcohol which comprises the passage over a copper catalyst of a mixture of alcohol vapor, air, and water vapor, the water and alcohol being present in substantially equal proportions by weight.

7. The process of dehydrogenation of ethyl alcohol which comprises the passage over a copper catalyst of a mixture of alcohol vapor, air, and water vapor, the water and alcohol being present in substantially equal proportions by weight, and the air being present in sufficient proportion to oxidize, to the form of water, approximately one-half of the hydrogen liberated by the dehydrogenation of the alcohol.

8. A continuous process for the dehydrogenation of an alcohol which comprises the passage over a catalyst at a temperature of 250 to 350° C. of alcohol mixed with water vapor and sufficient air to maintain the mixture at some selected temperature between 250 and 350° C.

9. A continuous process for the dehydrogenation of an alcohol which comprises the passage over catalytically active copper at a temperature of 250 to 350° C. of alcohol mixed with water vapor and sufficient air to maintain the mixture at some selected temperature between 250 and 350° C.

10. A continuous process for the dehydrogenation of an alcohol which comprises the passage over catalytically active copper at 250 to 375° C., of alcohol mixed with water vapor and sufficient air to maintain the mixture at some selected temperature between 250 and 350° C.

11. The process of decreasing the rate of poisoning of a dehydrogenation catalyst at a temperature of 250 to 350° C. by products of oxidation which comprises the admixture of at least one pound of water to every four of the compound that is to be dehydrogenated and passing the mixture over a catalyst.

12. The process of producing acetaldehyde from ethyl alcohol which comprises passing a mixture of 30 to 70 parts by weight of ethyl alcohol, and 70 to 30 of water over a copper catalyst at 275–335° C. and admitting sufficient air to the mixture in the catalyst chamber to maintain a temperature of 275–335° C.

13. The process of producing acetaldehyde from ethyl alcohol which comprises passing a mixture of 55 parts by weight of ethyl alcohol and 45 parts by weight of water over a copper catalyst at 275–335° C. and admitting sufficient air to the mixture in the catalyst chamber to maintain a temperature of 275–335° C.

14. The process of producing acetaldehyde from ethyl alcohol substantially free from impurities which comprises passing a mixture of 55 parts by weight of ethyl alcohol and 45 parts by weight of water over a porous copper catalyst at 275–335° C. and admitting sufficient air to the mixture in the catalyst chamber to maintain a temperature of 275–335° C.

15. The process of producing acetaldehyde from ethyl alcohol substantially free from catalyst poisons which comprises passing a mixture of 55 parts by weight of ethyl alcohol and 45 parts by weight of water over a copper catalyst at 275–335° C., and admitting sufficient air to the mixture in the catalyst chamber to maintain a temperature of 275–335° C.

16. The process of producing acetaldehyde from ethyl alcohol which comprises passing a mixture of 20 to 70 parts by weight of ethyl alcohol and 80 to 30 of water over a copper catalyst at 275–335° C. and admitting sufficient air to the mixture in the catalyst chamber to maintain a temperature of 275–335° C., the air being admitted at such positions, and in such amounts at each position that the temperature in the entire chamber is at no point below 275° C. or above 335° C.

17. The process of dehydrogenating ethyl alcohol which consists in passing over catalytically active copper in the vapor state at a temperature of 275 to 335° C., a mixture of approximately 55 parts by weight of alcohol and 45 parts of water previously warmed to 275 to 335° C., and in mixing with these vapors substantially 1000 cu. ft. of air (calculated to standard conditions of temperature and pressure) for each 70 lbs. of alcohol (calculated to the basis of 100% alcohol).

18. The process of dehydrogenation of an alcohol which comprises the passage over a catalyst at a temperature of 250 to 350° C. of a mixture of alcohol vapor, air, and water vapor.

In testimony, that I claim the foregoing as my own, and have hereto affixed my signature.

KENNETH B. LACY.